United States Patent [19]
Banks

[11] Patent Number: 4,641,395
[45] Date of Patent: Feb. 10, 1987

[54] DOWN RIGGER BOOM HINGE

[76] Inventor: Adam J. Banks, 13755 Jenny Dr., Warren, Mich. 48093

[21] Appl. No.: 778,569

[22] Filed: Sep. 20, 1985

[51] Int. Cl.$^4$ ........................ A01K 97/10; F16M 13/00
[52] U.S. Cl. ...................................... 16/348; 43/27.4; 248/514
[58] Field of Search ................... 43/27.4; 16/348, 343; 248/514, 517

[56] References Cited

U.S. PATENT DOCUMENTS

| | | | |
|---|---|---|---|
| D. 202,353 | 9/1965 | Webster | 248/514 X |
| 255,781 | 4/1882 | Graeser | 16/348 X |
| 358,527 | 3/1887 | Zwoyer et al. | 248/514 |
| 510,864 | 12/1893 | Johnson | 16/348 |
| 822,648 | 6/1906 | Carter | 16/348 X |
| 993,154 | 5/1911 | Dailey | 16/348 |
| 1,619,512 | 3/1927 | Heckman | 43/27.4 X |
| 2,159,902 | 5/1939 | Lewis | 114/364 |
| 2,734,708 | 2/1956 | Cohn | 248/517 |
| 2,969,899 | 1/1961 | Brooks | 248/514 X |
| 3,191,898 | 6/1965 | McCullough | 248/514 |
| 3,819,136 | 6/1974 | Finke | 248/517 |
| 4,478,169 | 11/1984 | Shrefler | 248/514 |

Primary Examiner—Jimmy C. Peters
Attorney, Agent, or Firm—Peter D. Keefe

[57] ABSTRACT

A hinge for pivoting down rigger booms from a horizontal to a vertical position and vice versa. The hinge comprises two elements, one stationary and adapted to removably attach to conventional fishing down rigger bases, the other rotatable about a pivot having removable connection to a down rigger boom. The hinge is designed so that the stationary element has a "U" shaped member adapted for mating with an insert member of the rotatable element, the two elements being apertured so that a pin or bolt rotatably connects them together. Interlocking lips formed from the two hinge elements provide automatic holding of the boom in a horizontal position. A circularly curved surface on the stationary element and a circularly curved surface on the insert member of the rotatable element, in concert with the pivot point, form a guide for rotating the boom. A slot in the stationary element is provided to accept the lip of the rotatable element when the boom is in the vertical position, gravity acting to pull the lip into the slot, thereby automatically holding it in that orientation. To lower the boom, the user simply lifts the boom out of the slot and then rotates the boom to the horizontal position, as guided by the curved surfaces. A fastening means is provided which permits the user to optionally tighten the hinge in either the horizontal or vertical position.

3 Claims, 5 Drawing Figures

U.S. Patent  Feb. 10, 1987  4,641,395
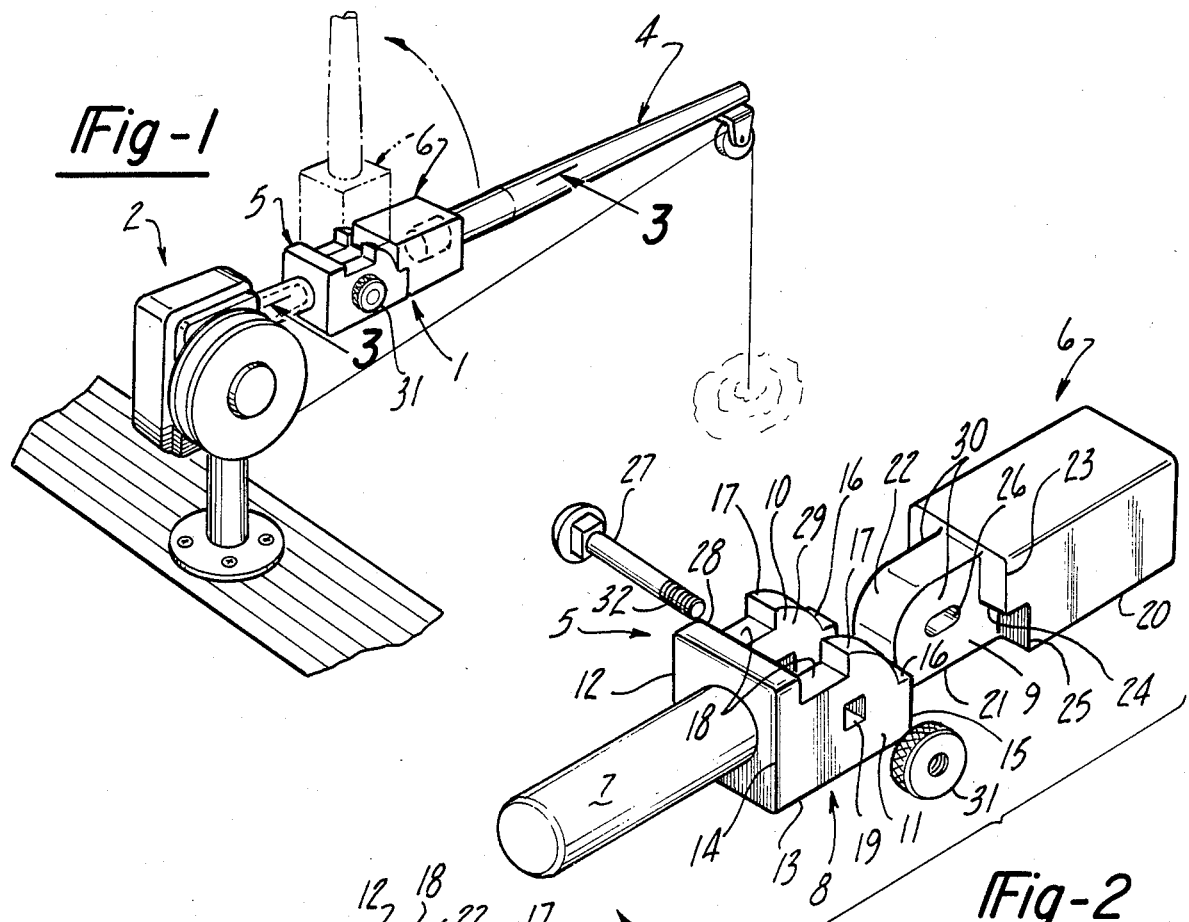
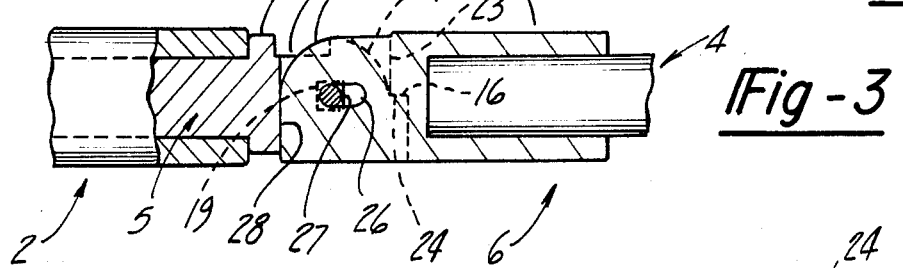
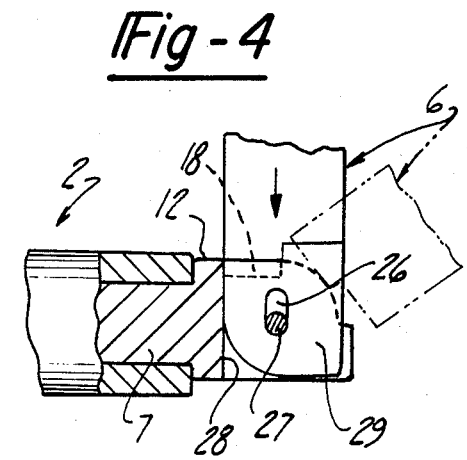
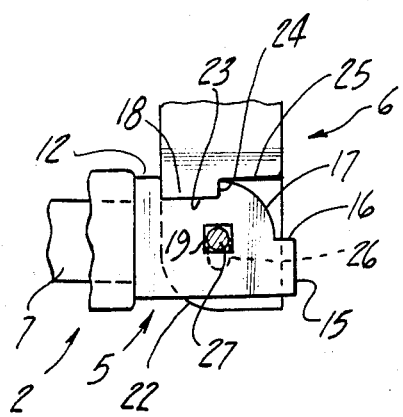

DOWN RIGGER BOOM HINGE

BACKGROUND OF THE INVENTION

This invention relates to down rigger systems used in deep water fishing, more particularly to an improvement in the boom structure permitting pivoting of the boom to a vertical storage position when the system is not in use.

In deep water fishing, lures commonly must be maintained at depths exceeding fourty feet. To assure that the lure is accurately positioned at the depth desired, a separate down rigger cable is employed having at its end a heavy weight from which the fishing line, upon the end of which is attached the lure, is connected thereto releasibly when a fish strikes. Down riggers are mechanical devices used to regulate the depth of the heavy weight, being composed generally of a base, a reel mechanism, and a boom member designed to support and position the cable, and the attached fishing line, well beyond the gunwhale of the boat, the purpose of which is to assure that the lines are kept away from the propellers during trolling as well as from interferring when a plurality of down riggers are in use at one time, as is usually the case. Often, these booms are quite long, on the order of five feet or more. They are horizontally attached to the down rigger base and can create problems of ingress and egress for the passengers on the boat as well as difficulties in maneuvering the boat, depending on the base location and the positional orientation of the boom. Present down rigger systems employ a horizontal pivot in the base which permits rotation of the boom along a plane parallel to the water surface. However, no matter what position the boom is rotated to, the boom continues to cause difficulty in that its substantial length all but assures no horizontal position will render it entirely out of the way, for all purposes and all situations.

The present invention solves this long standing problem by inserting a novel hinge unit between the down rigger base and the boom, permitting the boom to be rotated vertically to a position which is truly out of the way in terms of maneuvering the boat and freedom of movement of the passengers.

In the pertinent prior art, U.S. Pat. No. 1,619,512 to Heckman, discloses a means to vertically rotate the boom in a down rigger system utilizng a toothed clutch member which engages in response to tightening of a bolt. This solution, however, necessitates that the user be carefully attentive when rotating the boom, as no stays defining the preferred final angular position of the boom are provided. Further, the user would find the necessity of loosening a bolt sufficiently to allow for disengagement of the clutch teeth and rotating the boom while concomitently being careful to keep the potentially interlocking teeth at all times separated to be awkward and generally difficult to accomplish, especially in light of the often present heavy seas encountered in deep water fishing.

The present invention solves the need to provide an effective, simple, convenient and easy to use vertical pivoting means for down rigger booms. It is, therefore, the object of the invention to provide a hinge that is fully adaptable to conventional down rigger devices which will permit the vertical pivoting of down rigger booms in a manner which assures solid, controlled guidance and at the same time minimum of effort and difficulty to the user by providing automatically executing stays defining the final angular positions of the boom. This and other objects and advantages of the invention will become apparent from the following specification.

SUMMARY OF THE INVENTION

Conventional down rigger systems, employing long booms to provide for directing and supporting the cable associated with the heavy weights used to assure that the releasably attached fishing line lures run at precise depths in deep water, provide no effective and efficient means to store the booms when not in use. The present invention provides for a hinge which permits the long boom to be rotated to a vertical position, effectively rendering it entirely out of the way when not in use.

Down riggers have a base which is adapted to accept a long cylindrically shaped boom by means of a member having an axial cavity of cross sectional diameter slightly larger than that of the boom, and into which one end of the boom is adapted to insert. The present invention is a hinge having a member which is adapted to insert into the axial cavity of the down rigger base, and consequently is adaptable for use in conventional down rigger apparatus without any modification thereof.

The hinge is comprised of two elements: one being stationary and removably connected to the base of the down rigger unit, as described above, the other being rotatable about a pivot and being removably attached to the down rigger boom. The stationary element has a "U" shaped member which has a lip, a circularly curved surface, and a slot formed along its outer surface. The rotatable element has an axial cavity adapted to accept the insertion of a down rigger boom in the same manner as would the conventional down rigger base, an elongated member ending in a curved surface which inserts into the space formed by the "U" configured member of the stationary element, and a lip designed to mate with its counterpart in the stationary element. Pivoting is accomplished about a pin or bolt which is inserted through apertures in the "U" shaped member of the stationary element and an elongated aperture in the rotatable element.

In operation, the boom is held in a horizontal position by the interlocking of the lips formed by the two elements of the hinge. When the user desires to raise the boom, he need only rotate the boom to the vertical, the circular surfaces of the hinge elements providing a guide for rotation. When the vertical position is reached, the lip of the rotatable hinge element will fall into the slot in the stationary hinge element, accomodated by the elongated aperture in the pivoting element, thereby securing that position automatically. A wing nut may be turned via threads provided on the end of the pivot rod or bolt to tighten the hinge, securing its horizontal or vertical orientation when bouncing of the boat may be of particular concern. To lower the boom back to the horizontal position, the user untightens the pivot pin or bolt wing nut (if it had in fact been tightened) raises the boom up out of the slot, and slightly rotates the boom towards the horizontal. Immediately thereupon, the lip of the rotatable element will contact the curved surface of the stationary element thereby supporting the weight of the hinge. The user now simply continues to rotate the boom, guided by the curved surfaces until the interlocking lips formed from the stationary and rotatable elements contact, automatically holding the boom in the horizontal position.

Thus, an easy, effective and efficient means to vertically pivot down rigger booms is provided which involves a minimum of user effort while simultaneously ensuring precise guidance and control of movement of long and heavy down rigger booms.

BRIEF DESCRIPTION OF THE DRAWINGS

FIG. 1 is a perspective view illustrating conventional down rigger apparatus employing the present invention.

FIG. 2 is a detail of the present invention shown in the perspective view of FIG. 1, along lines 3—3.

FIG. 3 is a side view of the invention showing a boom in the horizontal position.

FIG. 4 is a side view of the invention depicting the location of the boom after rotation to the vertical is completed, but just preceeding lowering of the lip of the rotatable element into the slot of the stationary element.

FIG. 5 is a side view of the invention showing the boom locked in the vertical position.

DESCRIPTION OF THE PREFERRED EMBODIMENT

Referring to FIG. 1, illustrated is a perspective view of a conventional down rigger fishing apparatus incorporating the present invention. It will be seen that the hinge, 1, is mounted at one end to the down rigger base, 2, while the other end holds the down rigger boom, 4. In the horizontal position, as shown, the down rigger functions in an entirely normal and customary manner. When not in use, the hinge, 1, permits vertical pivoting of the boom, 4, up and out of the way.

Referring now to FIG. 2, which is a detail of the hinge, 1, in FIG. 1, the precise nature of the preferred embodiment of the invention can be understood. The invention consists of two main elements, each made preferably of a nonferrous metal: one, 5, stationary and attached to the down rigger base, the other, 6, adapted to rotate and connected to the down rigger boom. These two elements are adapted to work cooperatively through means of particularly shaped surfaces, so that the down rigger boom may be easily moved about a pivot point from a horizontal to a vertical position, and vice versa, in a controlled, secure manner, with the end points of travel well defined and self executing, as will be pointed out in the following description.

The stationary hinge element, 5, comprises at one end a cylindrical projection, 7, adapted for insertion into a down rigger base where, conventionally, the boom would ordinarily be inserted, thus permitting usage of the hinge in virtually all manner of down rigger apparatus utilizing removable booms. By reference to FIG. 2, it will be seen that the other end of the stationary hinge element, 5, is composed of two parallel projections, 10 and 11, emanating from opposite sides of a hinge base, 12, forming a "U" shaped member, 8, adapted to closey mate with a projection member, 9, on the pivoting element of the hinge, 6. The two projections, 10 and 11, of the "U" shaped member, 8, substantialy project the same length, 13, as the hinge base length, 14. At the end of the two projections, 10 and 11, farthest away from the hinge base, the substantially square profile, as defined by sides 13 and 14, is interrupted by an indentation, 16, forming a lip, the location of which is defined by side 15, which is substantially in length one-half that of side 14. A circular surface, 17, then rotates back toward the hinge base, 12, terminating in a slot, 18. An aperture, 19, is located in the approximate center of the square defined by sides 13 and 14 in the two projections, 10 and 11.

The rotatable hinge element, 6, comprises at one end a substantially cubic member, 20, having an axial cavity, particularly shown in FIG. 3, adapted to allow insertion of that end of a down rigger boom which is ordinarily intended for insertion into the down rigger base. The other end of the rotatable hinge element, 6, terminates in a projection member, 9, adapted for close tolerant fit when inserted into the "U" shaped member, 8, defined by projections 10 and 11, the dimensions of which being commensurate with the length and separation of said projections 10 and 11, and specifically, side 21 of the projection member, 9, is substantially equal in length to side 13 of projections 10 and 11. Projection member, 9, ends in a curved surface, 22, the width of which permitting a close tolerance fit between the projections, 10 and 11. The substantially cubic member, 20, terminates on the end adjacent to projection member, 9, in a surface, 23, which is substantially wider than said projection member, 9. An indentation, 24, forming a lip, of length equivalent to the indentation lip, 16, in said stationary hinge element results in a shortening of the substantially cubic member, 20, defined by side 25. An elongated aperture, 26, is provided in the approximate center of projection member, 9, as depicted substantially by the figure.

A hinge is formed when projection member, 9, is inserted into the "U" shaped member, 8. A pivot point is provided by the insertion of a pin or bolt, 27, through the apertures of the said members, 8 and 9, which also effects to hold elements of the hinge, 5 and 6, together. In the horizontal position, lip indentations, 16 and 24, in the hinge elements, 5 and 6, form opposing interlocking lip surfaces which, in concert with the pivot pin or bolt, 27, and the apertures, 19 and 26, define the maximum pivoting travel of the boom. This may be readily seen in FIG. 3.

Curved surfaces, 17 and 22, are adapted so that each contributes to guide the pivot action of the hinge. Surface, 17, and surface, 23, will slidably contact, as will surface, 22, and the inside of the hinge base surface, 28, as the hinge is rotated to the vertical position, as depicted in FIG. 4. When the vertical position is achieved, the length of surface 23, which is just less than that of the slot, 18, will fall into the slot, by action of gravity, the depth of which is substantially that of the length of lip indentation 24. FIG. 5 shows the pivoting hinge element, 6, now inserted into slot 18 as a result gravitational pull; the elongated aperture, 26, permitting the free movement, up and down, of said pivoting hinge element.

In operation, the horizontal position of the boom is defined by the cooperative action of the interlocking lips, 16 and 24, and the pivot pin or bolt, 27, and the apertures, 19 and 26. To lift the boom into the vertical position, the user need only grab the boom and raise it rotatably upwards. Pivoting guidance is provided by the close tolerance fit between curved surface, 22, and hinge base surface, 28; between curved surface, 17, and substantially cubic member surface, 23; between projection surface, 30, and inside surfaces, 29, of projections 10 and 11; and between apertures, 19 and 26, and the pivot pin or bolt, 27. Indeed, as the boom is raised, weight is increasingly transferred to the sliding surfaces 17 and 23, relieving the user from the weight of the boom. Additionally, there is no sideward play, as the hinge provides close and accurate guidance for the boom in all directions. In the vertical position, the elongated aperture, 26, permits the lip, defined by surfaces 23 and 24, of the pivoting element, 6, to slide into slot 18, thus automatically securing the boom in a vertical orientation. A wing nut, 31, attached to threads, 32, in the end of the pivot pin or bolt, 27, can be tightened to assure that the boom cannot be jarred out of this position due to the action of high seas or other bouncing effects encountered on the waters. In the raised position, the boom is entirely out of the way, freeing the interior (and exterior) of the boat from an undesirable intrusion of the boom. To lower the boom in anticipation of use, the user releases the wing nut (if it had been used to aid in securing the boom position), grabs the boom and raises the lip of the pivoting element out of the slot in the stationary element, and rotates the hinge slightly in the direction towards lowering the boom, just sufficiently to allow surfaces 17 and 23 to slidably mate; the user may then somewhat loosen his grasp, since now the weight of the boom will be supported by these surfaces. Now, the user need only rotate the boom in the direction of lowering it to the horizontal. It will be fully guided in the manner described above for raising of the boom to the vertical. Upon conclusion of rotation of the boom, the interlocking lips, 24 and 16, will act in concert with the pivot pin or bolt, 27, and apertures, 19 and 26, to automatically hold the boom in the horizontal orientation. The wing nut may then be tightened, if desired, to assure this position against the effects of bouncing in the event of heavy seas.

In the preferred embodiment, the hinge elements are made of aluminum, the pivot pin is a carriage bolt, a large diameter knurled knob acts as the wing nut, and the apertures, 19, in the stationary hinge element are square shaped, adapted for fitting with the inside of the head of the carriage bolt on either side, as use may favor. A small air escape hole is provided in the substantially cubic member, 20, facilitating insertion of the boom therein, and a set screw is provided, also on the substantially cubic member, for fastening the boom to the hinge by friction when it is tightened.

To those skilled in the art to which this invention apertains, it will be clear that the hinge herein described may be adapted for other than only down rigger applicabilities, that among these are cranes, derricks, and other manner of devices requiring strong, stable, and accurately controlled pivoting means; further, that the present invention may be readily modified to adapt to a wide variety of environmental circumstances, including modification of the base, 12, and substantially cubic member, 20, for attachment to surfaces and objects other than encountered in fishing applications; and, finally, that a wide range of materials may be substituted for fashioning the hinge elements, as may be appropriate under particular usages, such as strong, durable plastics or metals.

What is claimed is:

1. A hinge having automatic execution of stays at the end points of travel, comprising:
   (a) a stationary hinge element, one end of which having means to connect to a stationary object, the other terminating in a hinge base from which emanates from opposite sides thereof two parallel projections, forming a "U" shaped member, each said parallel projections having a lip, a circularly curved surface, a slot, and an aperture;
   (b) a rotatable hinge element, one end of which having means to connect to an object to be rotated, the other end of which having a lip and a projection member which inserts into said "U" shaped member, having a circularly curved surface of convex shape and having an elongated aperture therein which aligns with said aperture in each of said parallel projections when said projection member is inserted into said "U" shaped member; and,
   (c) a pin which inserts through said aligned apertures thereby holding said stationary and said rotatable hinge elements together, and forming a pivot point about which said rotatable hinge element may pivot in relation to said stationary hinge element, guided by sliding interaction of the respective surfaces of said stationary and rotatable hinge elements including the sliding interaction of said circularly curved surface of convex shape on said projection member in relation to the surface of said hinge base of said "U" shaped member, where one end of travel is defined by interlocking of said lips, and the other end of travel is defined by said lip of said rotatable hinge element inserting into said slot in said stationary hinge element.

2. A hinge having automatic execution of stays at the end points of travel, comprising:
   (a) a stationary hinge element, one end of which forming a cylindrical projection, the other terminating in a hinge base from which emanates from opposite sides thereof two parallel projections, forming a "U" shaped member, each said parallel projections having a lip, a circularly curved surface, a slot, and an aperture;
   (b) a rotatable hinge element, one end of which having an axial cavity, and at the other end a lip and a projection member which inserts into said "U" shaped member, having a circularly curved suface of convex shape and having an elongated aperture therein adapted to align with said aperture in each of said parallel projections when said projection member is inserted into said "U" shaped member; and,
   (c) a pin which inserts through said aligned apertures, thereby holding said stationary and said rotatable hinge elements together, and forming a pivot point about which said rotatable hinge element may pivot in relation to said stationary hinge element, guided by sliding interaction of the respective surfaces of said stationary and rotatable hinge elements including the sliding interaction of said circularly curved surface of convex shape on said projection member in relation to the surface of said hinge base of said "U" shaped member, where one end of travel is defined by interlocking of said lips, and the other end of travel is defined by said lip of said rotatable hinge element inserting into said slot in said stationary hinge element.

3. A down rigger apparatus having a boom hinge, comprising:
   (a) a down rigger base;
   (b) a stationary hinge element, one end of which forming a cylindrical projection for inserting into said down rigger base, the other terminating in a hinge base from which emanates from opposite sides thereof two parallel projections, forming a "U" shaped member, each said parallel projections having a lip, a circularly curved surface, a slot, and an aperture;
   (c) a rotatable hinge element, one end of which having an axial cavity, and at the other end a lip and a projection member which inserts into said "U"

shaped member, having a circularly curved surface of convex shape and having an elongated aperture therein adapted to align with said aperture in each of said parallel projections when said projection member is inserted into said "U" shaped member;

(d) a down rigger boom which inserts into said axial cavity in said rotatable hinge element; and, (e) a pin which inserts through said aligned apertures, thereby holding said stationary and said rotatable hinge elements together, and forming a pivot point about which said rotatable hinge element may pivot in relation to said stationary hinge element, guided by sliding interaction of the respective surfaces of said stationary and rotatable hinge elements including the sliding interaction of said circularly curved surface of convex shape on said projection member in relation to the surface of said hinge base of said "U" shaped member, where one end of travel is defined by interlocking of said lips, and the other end of travel is defined by said lip of said rotatable hinge element inserting into said slot in said stationary hinge element.

* * * * *